Oct. 19, 1926.  1,604,034
W. R. GILLAM ET AL
TIRE MOLD
Filed May 29, 1925   3 Sheets-Sheet 3

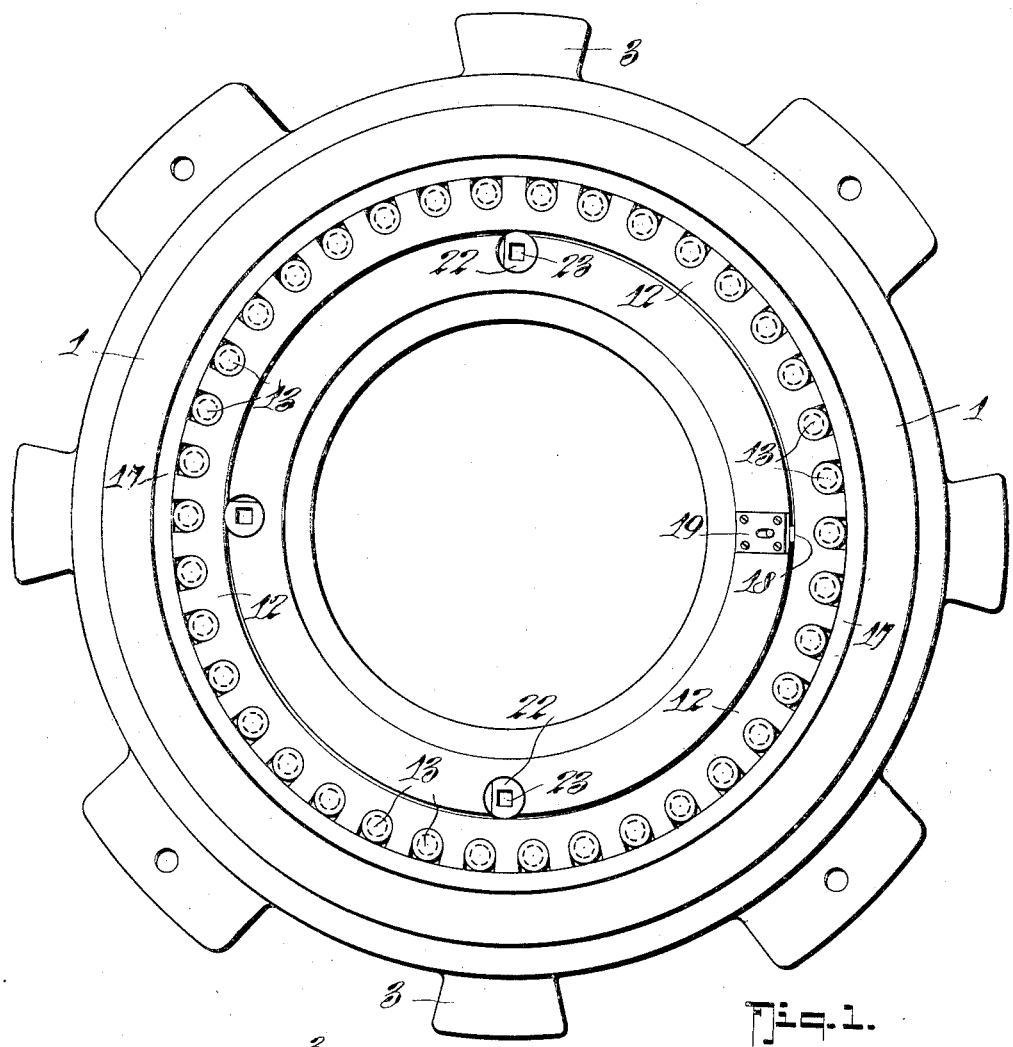
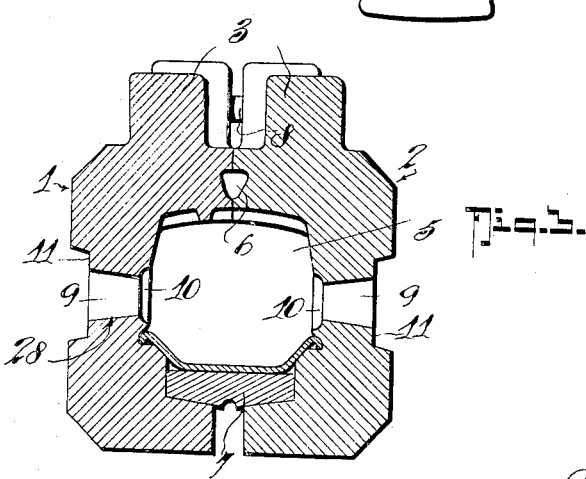

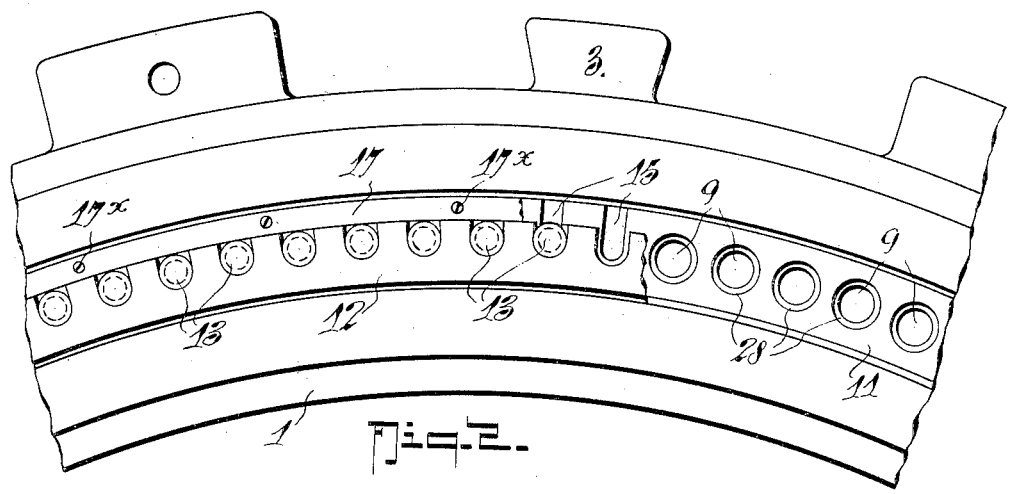
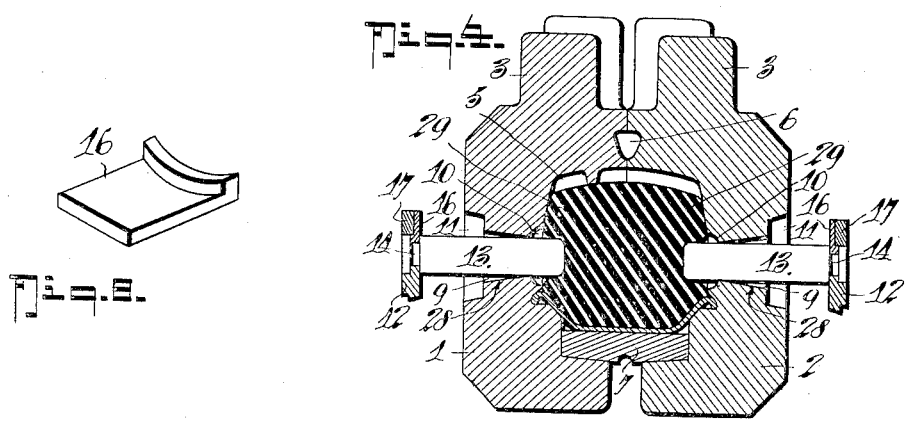
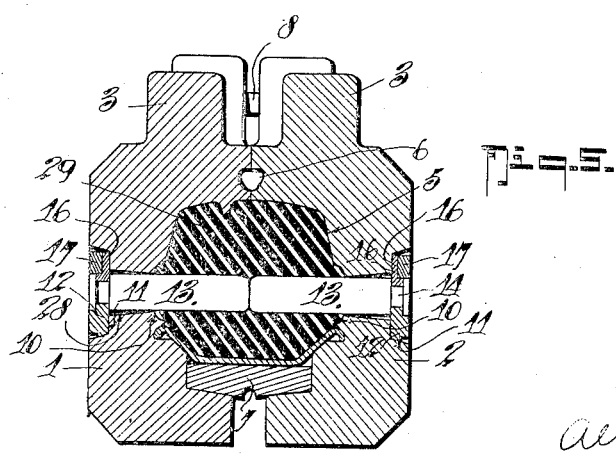

INVENTOR
Wallace R. Gillam.
Mark A. Replogle.
BY
ATTORNEY

Patented Oct. 19, 1926.

1,604,034

UNITED STATES PATENT OFFICE.

WALLACE R. GILLAM, OF TALLMADGE, AND MARK A. REPLOGLE, OF AKRON, OHIO, ASSIGNORS TO LAMBERT TIRE & RUBBER CO., OF BARBERTON, OHIO, A CORPORATION OF ARIZONA.

TIRE MOLD.

Application filed May 29, 1925. Serial No. 33,798.

Our invention has for its general object to provide a mold for forming and vulcanizing cellular cushion tires.

Our invention relates directly to that class of tire molds that embodies pistons or plunger pins which pass through the mold walls for the purpose of distributing and compressing the tire making material within the mold.

In cushion tire making practice, as the tires are usually constructed, trouble is often encountered due to the great pressures necessary to force the whole halves home, or to the mold closed condition. Great pressures are necessary to force the material into all of the recesses of the mold, and to drive out the entrapped air. In the general practice of making cellular tires, the cells or holes are frequently wrought into the tire by means of plugs or metallic bodies fastened to the inner surfaces of the molds. These plugs reduce the volume of the inner mold or the mold cavity by an amount equal to their cubical contents. Therefore, the displacements they cause, and the piston area of the sides of the molds require an unusually great pressure to force the two half molds together, and to drive out the air so as so make a perfect tire.

In molds where a multiplicity of plunger pins are required to form or shape a tire, it has been found advantageous to affix a full circle of said pins to one base-ring so that they may be handled with precision and dispatch. It is necessary for the above mentioned pins to fit snugly into the holes in the sides or walls of the tire mold, but they should not bind or wedge due to imperfections in alignment. It is understood that any hole drilling device used to form holes in the mold walls may vary from true position due to hard spots or soft spots in the casting or shell-wall. Also, any shrinkage strains in the casting or shell-wall may shift the hole or parts of the hole out of alignment after it once has been correctly bored. This last mentioned cause becomes more serious due to the heating and cooling of the mold during the vulcanizing processes.

It is highly important that the pin-ring may fit perfectly in any position so as to preclude any fumbling, or loss of time, by the workmen in locating particular pins in particular holes. Since there are thirty or more holes in each mold-half, and as there must be a properly located pin pressed into each hole, the matter of pin location becomes a serious proposition by the ordinary methods of locating these pins in the base-ring. It is also important that a pin-ring may be locked into position as is often desired during the handling or manipulation of the molds in the practice of forming and curing of tires.

The purposes of our invention therefore are as follows:

(1) To provide means to produce an internal expanding pressure in the molds without increasing the external pressures;

(2) To provide more avenues of escape for entrapped air;

(3) To provide an automatically shiftable or adjustable pin in each approximate location in the pin-ring, so as to permit of a perfect fitting of all the pins even though they may lack a fraction of an inch of true alignment. In other words, each pin is located perpendicular to the ring surface, but in such a manner that it is readily shifted, in any side direction, an amount equal to the maximum tolerance allowable or necessary in drilling the holes in the mold walls;

(4) To provide a means to lock pin-rings in a fixed condition even though the pins may be entered in any position, that is, the locks must be potent regardless of their positions in the mold back.

(5) To provide a mold by the use of which we are able to produce a more dense and longer wearing tire, make a tire having a better finished appearance, reduce the amount of overflow and losses of material preparation and reduce the time and labor cost of filling the molds ready for the curing processes.

With other objects in view that will be clear to those skilled in the art the invention resides in those novel structures, combinations and arrangements of parts, all of which will be first fully described, and then be specifically pointed out in the appended claims, reference being had to the accompanying drawings, in which:

Figure 1 is a side elevation of a mold embodying our invention.

Figure 2 is an enlarged detail elevation of a part thereof.

Figure 3 is a cross section on the line 3—3 of Figure 1, showing the mold without the pins in place.

Figure 4 is a cross section similar to Figure 3 with the tire carcass in place and the pins partly inserted.

Figure 5 is a cross section similar to Figures 3 and 4 with the pins fully inserted and the pin-ring locked.

Figure 9 is a detail section of a modification of the invention.

Figure 6:
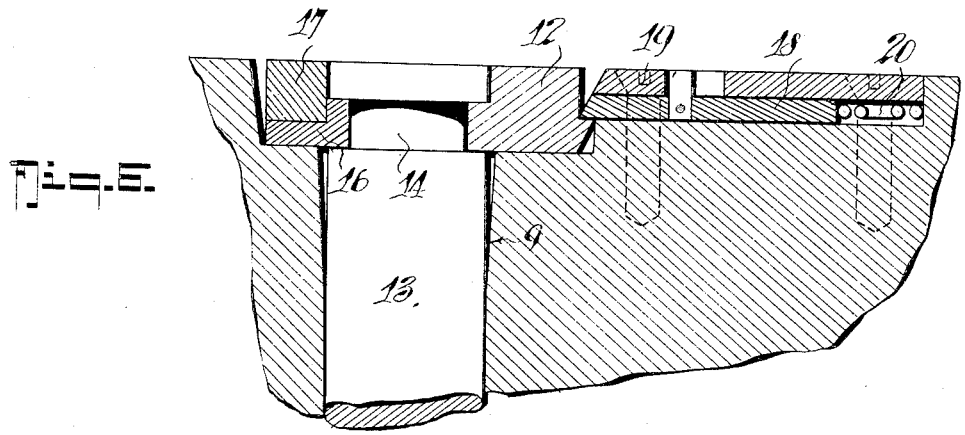
Figure 6 is a detail section on the line 6—6 of Figure 2, showing the slide-type lock.
Figure 7:
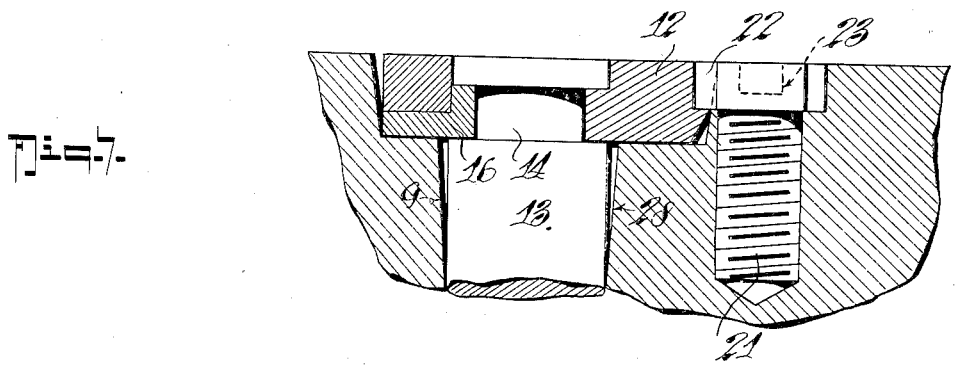
Figure 7 is a detail section on the line 7—7 of Figure 2, showing the cam or rotary type lock.
Figure 8:
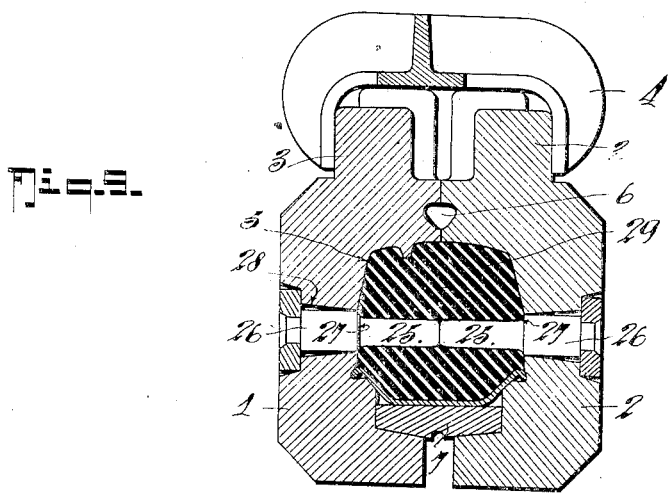
Figure 8 is a detail perspective view of one of the pin locating insert elements.

In the drawings, in which like numerals of reference designate like parts in all the figures, 1 and 2 represent the half molds which are provided with the usual lugs 3 to receive the clamps 4 that hold the mold halves together.

The mold encloses a forming chamber 5 and is provided with a tread rubber overflow and air escape annular pocket 6. 7 designates the backing ring against which the tire rim 24 lies when in place in the mold and 8 represents dowel pins for keeping the mold halves in register.

Each mold half has a series of holes 9 for the introduction of the cavity or cell forming pins 13 and the mold may also be provided with air traps or cavities 10 that surround the holes 9 at the ends adjacent the mold cavity.

Each mold half is also provided with an annular recess 11 for the reception of the pin rings 12, the recesses having their side walls inclined slightly outward so as to facilitate the location or introduction of the pin rings.

The pin rings 12 are provided for the purpose of carrying the pins 13. The pins 13 have grooves 14 and the pin rings have slots 15 in which the pins fit, the slots being of a diameter to cooperate with the grooves 14 of the pins and when the pins have been inserted finger elements 16 are introduced into the slots 15 and into the pin grooves 14 to retain the pins in position, it being understood that a suitable amount of play is provided between the surface of the pin grooves and the adjacent surface of the pin rings and their finger elements.

17 is a retaining ring received on the pin ring and if desired permanently secured by spot welding or otherwise to hold the pins or finger elements against coming off the pin rings. While the retaining ring 17 may be permanently secured as stated it may be found preferable that under certain conditions to make the ring removable, in which event it can be held in place by suitable screws 17ˣ as indicated in Figure 1.

The pin rings 12 are held within the recesses 11 by suitable latches. These latches may be either of the slide type or of the rotary cam type or both types may be employed on one mold unit if desired. In the drawings I have shown both types applied for purposes of illustration.

18 designates the slide latch bolts mounted in suitable housings 19 set flush with the mold surface, and the slide latch bolts 18 are held projected by suitable springs 20.

21 designates the rotary screw latches or cam latches having holding segments 22 which, when turned over, the pin ring will hold it in place, the screw latches having squared recesses 23 for the reception of a suitable wrench.

Instead of providing the molds with the air traps 10 the pins may be shaped for this purpose, for instance as illustrated in Figure 9 of the drawings, by reference to which it will be seen that the pins have reduced portions 25 connected with the main body portions 26 by concave annular surfaces 27.

From the foregoing it will be noted that when using the invention the tire blank 29 is produced by a tubing machine and its mass is so regulated that it will fill the mold when the pins are inserted to displace the material from the cavity or cell portions and cause it to fill out the mold chamber, the ideal condition being that only sufficient rubber be put into the mold to exactly fill it and make a perfect tire when the mold is closed and the pins have been inserted. Of course, in actual practice a slight excess of rubber must be used and this will escape through the openings in the mold and form thin webs or fins which must be trimmed off the tire after vulcanization.

The holes 9 in the mold sides through which the pins pass are also preferably tapered at their entrance ends, as at 28, to facilitate the finding of the holes by the pins in placing the pins in the mold halves.

By countersinking the pin rings so that their outer faces are flush with the outer surface of the mold and by countersinking the pin ring latches in the same manner, it is possible to pile molds one on top of another in the vulcanizing kettle, thereby increasing the number of molds that can be put into a kettle over what the number would be were the pin rings raised above the surfaces of the mold.

It will also be noted from the foregoing that with our construction the desired amount of pin shifting is provided for in the ring construction. This will permit each pin to fit its hole in the mold snugly without any side binding. That is, the slightly movable pins provide all of the tolerance required for perfect operation. We also wish to direct attention to the fact that with our construction each pin may be driven home, by, or through its head directly, and entirely independent of the ring. This relieves the rings 12 of strains that might affect its shape, if the pins were dependent on the ring for being pressed home. The ring 12 thus becomes a holder for a general location of the plunger pins, but each hole in the mold will specifically align its pin when power pressure is applied to drive the plunger pins home.

From the foregoing description, taken in connection with the accompanying drawings, it is thought that the complete construction, operation and advantages of our invention will be clear to those skilled in the art to which it appertains.

What we claim is:

1. A cushion tire mold having tapering holes coincident with the cells or holes to be wrought into the body of the tire, and pins insertable through said holes.

2. A cushion tire mold having a series of pin holes in its walls coincident with the cells or holes to be wrought into the body of the tire, a series of pins insertable one in each hole and a pin ring for carrying the pins of the series.

3. A cushion tire mold having a series of pin holes in its walls coincident with the cells or holes to be wrought into the body of the tire, a series of pins insertable one in each hole and a pin ring for carrying the pins of the series, means slidably mounting said pins in said ring to allow the pins to find their centers in the holes.

4. A cushion tire mold having tapering holes coincident with the cells or holes to be wrought into the body of the tire, and having a countersunk cavity formed around each hole inside the mold, and pins insertable through said holes.

5. A cushion tire mold having a series of pin holes in its walls coincident with the cells or holes to be wrought into the body of the tire, a series of pins insertable one in each hole and a pin ring for carrying the pins of the series, said mold having a recess to receive said pin ring.

6. A cushion tire mold having a series of pin holes in its walls coincident with the cells or holes to be wrought into the body of the tire, a series of pins insertable one in each hole, a pin ring for carrying the pins of the series, said mold having a recess to receive said pin ring, and latches for holding the pin ring to the mold.

7. A cushion tire mold having a series of pin holes in its walls coincident with the cells or holes to be wrought into the body of the tire, a series of pins insertable one in each hole, a pin ring for carrying the pins of the series, said mold having a recess to receive said pin ring, and latches for holding the pin ring to the mold, said cavity and said ring being of such depth that the outer surface of each will be flush.

8. In combination with a cellular cushion tire mold having holes coincident with the desired cells in the finished tire, a plunger-pin-ring, pins slidably fixed to said ring and adapted to snugly fit into said holes to avoid binding due to mis-alignment.

9. In combination with a cellular cushion tire mold having holes coincident with the desired cells in the finished tire, a plunger-pin-ring, pins slidably fixed to said ring and adapted to snugly fit into said holes to avoid binding due to mis-alignment, said ring having shouldered supporting slots coincident with the holes in the mold, said slots adapted to receive said pins with a loose sliding fit, and means to retain said pins in said slots.

10. In combination with a cellular cushion tire mold having holes coincident with the desired cells in the finished tire, a plunger-pin-ring, pins slidably fixed to said ring and adapted to snugly fit into said holes to avoid binding due to mis-alignment, said ring having shouldered supporting slots coincident with the holes in the mold, said slots adapted to receive said pins with a loose sliding fit, and an outside shrinkage retaining-ring to hold said pins in place in their respective slots.

11. In combination with a cellular cushion tire mold having holes coincident with the desired cells in the finished tire, a plunger-pin-ring, pins slidably fixed to said ring and adapted to snugly fit into said holes to avoid binding due to mis-alignment, said ring having shouldered supporting slots coincident with the holes in the mold, said slots adapted to receive said pins with a loose sliding fit, means to retain said pins in said slots, and means to hold said pin ring in place on the mold.

12. In combination with a cellular cushion tire mold having holes coincident with the desired cells in the finished tire, a plunger-pin-ring, pins slidably fixed to said ring and adapted to snugly fit into said holes without binding due to mis-alignment, said ring having shouldered supporting slots coincident with the holes in the mold, said slots adapted to receive said pins with a loose sliding fit, means to retain said pins in said slots, and means to hold said pin ring in place on the mold, said means comprising latches mounted flush with the mold and said mold having a recess to receive the pin ring and locate it flush with the mold.

13. In combination with a cellular cushion tire mold having holes coincident with the desired cells in the finished tire, a plunger-pin-ring, pins slidably fixed to said ring and adapted to snugly fit into said holes without binding due to mis-alignment, said ring having shouldered supporting slots coincident with the holes in the mold, said slots adapted to receive said pins with a loose sliding fit, means to retain said pins in said slots, and means to hold said pin ring in place on the mold, said means comprising latches mounted flush with the mold and said mold having a recess to receive the pin ring and locate it flush with the mold, said latches each comprising screws having a chordal-segment head, said pin ring having portions to be engaged by said head for holding purposes.

14. A tire mold having pin holes and a ring groove aligned with the same, a pin ring with pins to fit said grooves and holes respectively, said holes being tapered with the larger end outward and said grooves being similarly tapered whereby to facilitate entrance of the pins and ring, and means mounting said pins on said ring for self-centering adjustment.

15. A cushion tire mold, having tapering holes coincident with the cells to be wrought into the body of the tire and having annular grooves intersecting the holes, pins insertable through said holes and pin rings carrying said pins and adapted to lie in said grooves with the outer faces of the rings flush with the adjacent outer faces of the molds.

WALLACE R. GILLAM.
MARK A. REPLOGLE.